(12) United States Patent
Menhart et al.

(10) Patent No.: US 12,719,336 B2
(45) Date of Patent: Aug. 25, 2026

(54) STATOR OF AN ELECTRIC PRIME MOVER WITH SEALED SEPARATION PLATE

(71) Applicant: Schaeffler Technologies AG & Co. KG, Herzogenaurach (DE)

(72) Inventors: Michael Menhart, Igling (DE); Stefan Riess, Kaufering (DE); Johann Oswald, Eschenlohe (DE); Carsten Sonntag, Gauting-Konigswiesen (DE); Andra Carotta, Munchen-Hadern (DE); Daniel Mahler, Hofstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 212 days.

(21) Appl. No.: 18/554,483

(22) PCT Filed: Apr. 8, 2022

(86) PCT No.: PCT/DE2022/100266
§ 371 (c)(1),
(2) Date: Oct. 9, 2023

(87) PCT Pub. No.: WO2022/214144
PCT Pub. Date: Oct. 13, 2022

(65) Prior Publication Data

US 2024/0204590 A1 Jun. 20, 2024

(30) Foreign Application Priority Data

Apr. 10, 2021 (DE) ........................ 102021108955.7

(51) Int. Cl.
*H02K 9/197* (2006.01)
*H02K 1/20* (2006.01)
*H02K 21/24* (2006.01)

(52) U.S. Cl.
CPC ............... *H02K 9/197* (2013.01); *H02K 1/20* (2013.01); *H02K 21/24* (2013.01)

(58) Field of Classification Search
CPC ................................ H02K 21/24; H02K 1/20
See application file for complete search history.

(56) References Cited

U.S. PATENT DOCUMENTS

2013/0147291 A1 6/2013 Woolmer et al.
2015/0048696 A1* 2/2015 Kobler .................. H02K 21/24 310/44

(Continued)

FOREIGN PATENT DOCUMENTS

CN 106998108 A 8/2017
JP 2005261083 A * 9/2005
WO 01/11755 A1 2/2001

(Continued)

OTHER PUBLICATIONS

Kaneko (JP 2005261083 A) English Translation (Year: 2005).*

*Primary Examiner* — Tulsidas C Patel
*Assistant Examiner* — Robert E Mates
(74) *Attorney, Agent, or Firm* — Volpe Koenig

(57) ABSTRACT

A stator of an electric prime mover and to an electric prime mover having the stator. The stator includes a stator core and windings of at least one electrical conductor that are arranged annularly on the stator core, and at least one wet chamber through which a coolant flows, so that heat from at least one winding can be absorbed by the coolant.

16 Claims, 6 Drawing Sheets

(56) References Cited

U.S. PATENT DOCUMENTS

2017/0063182 A1 3/2017 Heilman et al.
2022/0014050 A1* 1/2022 Saito ........................ H02K 3/22

FOREIGN PATENT DOCUMENTS

WO 2020147551 A1 7/2020
WO 2020181322 A1 9/2020
WO 2020229399 A1 11/2020

* cited by examiner

A-A
50
21
130
72 90
73
40
43
75 43
80
100
74
120
101
91
140
120 79
75 E
74
71
76
150
77
30
161
160
150 C 161 73 60
90 72
43
130
110
74

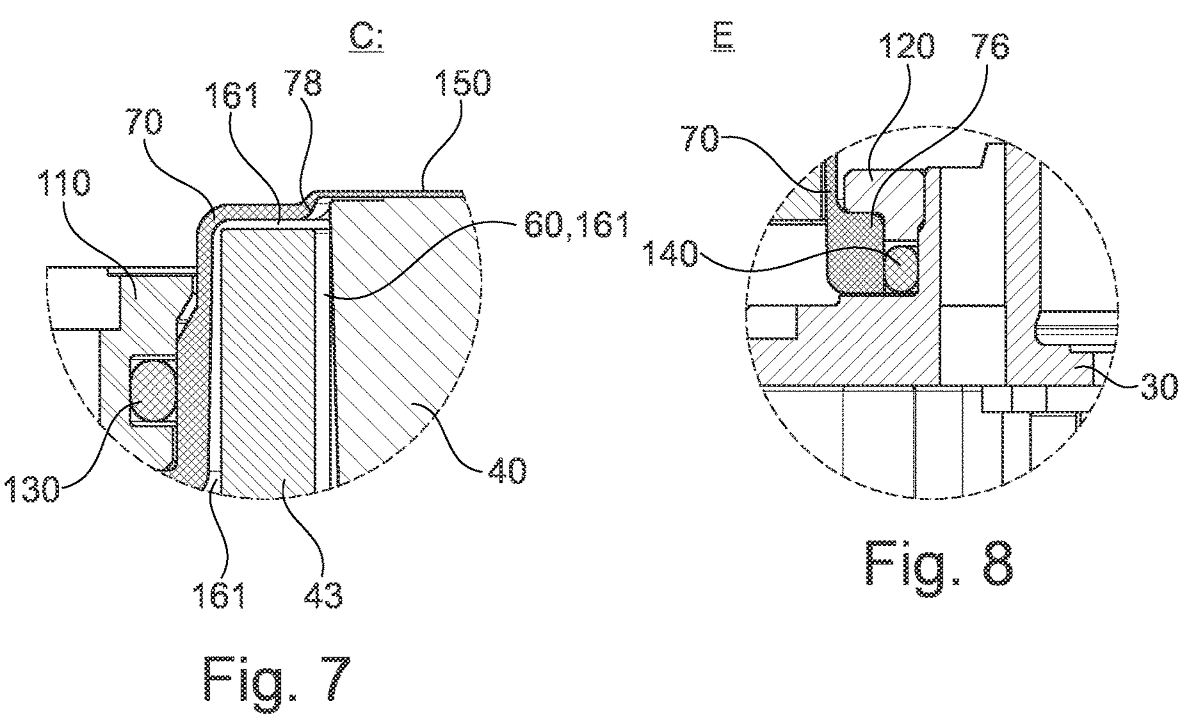
Fig. 7
Fig. 8
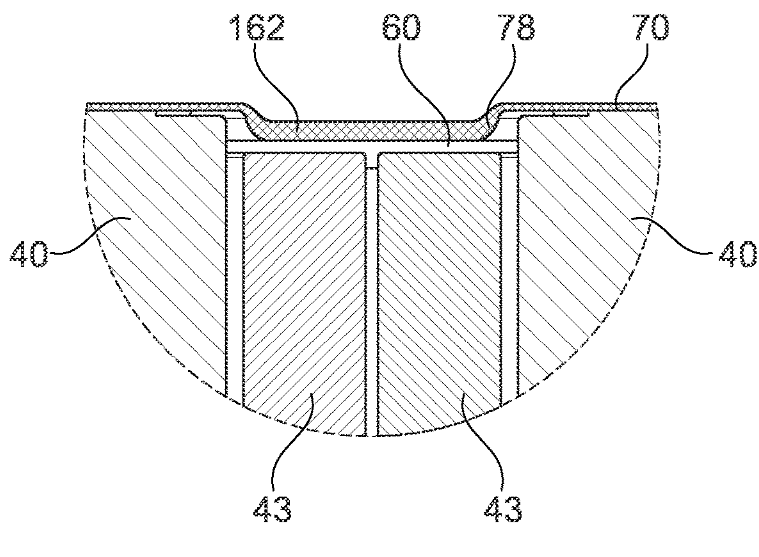
Fig. 9

STATOR OF AN ELECTRIC PRIME MOVER WITH SEALED SEPARATION PLATE

CROSS-REFERENCE TO RELATED APPLICATIONS

This application is the U.S. National Phase of PCT Appln. No. PCT/DE2022/100266, filed Apr. 8, 2022, which claims the benefit of German Patent Appln. No. 102021108955.7, filed Apr. 10, 2021, the entire disclosures of which are incorporated by reference herein.

TECHNICAL FIELD

The disclosure relates to a stator of an electric prime mover, in particular an axial flux machine, and to an electric prime mover having the stator.

BACKGROUND

The electric drive train of electrically drivable motor vehicles is known from the prior art. This consists of components for energy storage, energy conversion and energy transmission. The energy conversion components include electric machines, for example axial flux machines. Axial flux machines are known from the prior art in various designs with one or more stators and one or more rotors.

An electric axial flux machine, also referred to as a transverse flux machine, is a motor or generator in which the magnetic flux between a rotor and a stator is realized parallel to the axis of rotation of the rotor. Other names for electric axial flux machines are also brushless DC motors, permanently excited synchronous motors or disc motors.

Depending on the power range or application, it is often necessary to dissipate heat generated by various losses in electric machines by means of effective cooling. Cooling ensures that critical temperatures, which could lead to damage to materials and components, are prevented. In addition, cooling helps to improve the efficiency of the electric machine, since, in particular, the ohmic resistance in electrical conductors is highly temperature-dependent, which means that power losses increase at higher temperatures.

The cooling of an electric rotary machine usually takes place largely in the stator. In this process, heat is dissipated from the wire coil to the surrounding housing or to the stator body itself and/or the surrounding air.

An electrical axial flux machine is known from WO 01/11755 A1, which has a stator on each side of a rotor. The stators, in turn, each have an annular yoke with grooves extending radially from the inside to the outside, in which multi-phase windings are guided.

Here, cooling takes place by means of convection to the surrounding air.

Particularly in the case of electric machines that have a high torque or power density, a surface cooling with heat dissipation to the surrounding air is often not sufficient, so that cooling by means of a cooling fluid is necessary. In principle, oils, water or water mixtures such as water-glycol, but also dielectric fluids can be used as cooling fluids. These cooling fluids can contact or wash around the current-carrying components substantially directly for the purpose of efficient cooling, thereby ensuring a high power density.

However, there is also a need to prevent or reduce speed-related turbulence of the cooling fluid, as this can cause flow-related and/or friction-related energy losses of the rotating components. This can make it necessary to fluidically separate rotating components of an electric prime mover from statically arranged components.

SUMMARY

Under consideration of the above, the present disclosure is based on the object of providing a stator of an electric prime mover and a long-life electric prime mover equipped with the stator which combine an axially compact size with high performance.

The object is achieved according to the disclosure by a stator of an electric prime mover according to claim 1 as well as by an electric prime mover according to claim 10. Advantageous embodiments of the stator are provided in the dependent claims 2-9.

The features of the claims can be combined in any technically useful manner, wherein the explanations from the following description as well as features from the figures can also be consulted for this purpose, which comprise supplementary embodiments of the disclosure.

The disclosure relates to a stator of an electric prime mover, in particular an axial flux machine, which comprises a stator core and windings of at least one electrical conductor arranged on the stator core in an annular shape. Furthermore, the stator comprises at least one wet chamber for a coolant to flow through, so that heat from at least one winding can be absorbed by the coolant, and a separation element, by means of which the wet chamber is separated in a substantially liquid-tight manner from a dry chamber of the electric prime mover at least on an axial side of the stator. The separation element is sealed with respect to the stator core at a first periphery and at a second periphery, wherein the first periphery has a smaller radial extent than the radial outer side of the stator core and a larger radial extent than the radial outer side of the annular shape of the winding arrangement and the second periphery has a larger radial extent than the radial inner side of the stator core and a smaller radial extent than the radial inner side of the annular shape of the winding arrangement.

In the context of the present description and claims, the terms "radial", "axial" and "in the circumferential direction" refer to the axis of rotation of an electric prime mover equipped with the stator, unless explicitly designated otherwise.

The stator core is in particular a part of a housing or an otherwise supporting part of the stator, on which stator teeth are arranged or which has stator teeth as integral components supporting the windings. A stator tooth is understood to be a projection projecting axially from the stator core, which has a substantially two-dimensional design, and around which the winding is wound.

The stator core can be composed of multiple individual parts.

For example, the stator can comprise a fastening ring which is screwed and/or caulked to the stator core and which serves for the abutment of a respective seal which realizes the sealing effect with respect to the separation element.

It is not to be excluded that the fastening ring itself is also sealed off from the stator core with a further sealing element.

Thus, it is provided that the separation element is sealed with respect to the stator core.

The radial inner side of the stator core is the radial edge of a bore or passage extending axially through the stator core for the passage of a rotor shaft. Insofar as the stator should not have an axial opening, the radial inner side of the stator core is the central region of the stator core through which the ideal axis of rotation of the electric prime mover extends.

The separation element is arranged in particular on an axial side of the wet chamber.

In this regard, the totality of all windings forms the annular shape. In an axial flux machine, this means that multiple windings are arranged on respective stator teeth, wherein the stator teeth are arranged in an annular shape and consequently the windings arranged on the stator teeth are also arranged along an annular shape.

In a corresponding manner, the wet chamber can also form an annular shape. If applicable, the stator comprises multiple wet chambers arranged together in an annular shape. Compared to designs in which a separate cooling of individual stator teeth or the windings located there must be carried out, a simple cooling of all windings is possible here, with a correspondingly low effort being required for sealing the wet chamber required for this and a correspondingly low installation space requirement.

In particular, the windings are arranged in at least one wet chamber.

For the purposes of the disclosure, a stator is also understood to mean a stator half which, together with another stator half, forms a complete stator unit of an axial flux machine, wherein it is provided that a rotor of the axial flux machine is positioned between the two stator halves.

Due to the design of the stator according to the disclosure, it can be optimally cooled even with a small axial extent and consequently ensure a high power density. In this regard, the separation between the wet chamber and the dry chamber is ensured, so that the rotor in the dry chamber can be operated at a high speed without flow losses.

In an advantageous embodiment, the separation element axially delimits the stator. Accordingly, the separation element is arranged in the electric air gap between the stator and rotor, and delimits the mechanical air gap between the stator and rotor.

Advantageously, the separation element substantially forms a plane on its axial side. Small forming elements outside of the planar course are not excluded in this regard, but the course of the separation element on the axial side of the stator is substantially planar, i.e., two-dimensional.

In a further advantageous embodiment, the separation element has two substantially annular walls which are arranged concentrically and extend with at least one component of their extent in the axial direction, so that an annular cavity is formed between the annular walls for axial and, in regions, radial separation of the likewise substantially annular wet chamber from an adjacent dry chamber.

In this regard, the annular walls form a separation of the wet chamber in the radial direction, wherein a connecting section of the separation element located in the radial direction between the annular walls realizes the axial separation of the wet chamber from the dry chamber.

The axial outer side of the connecting section is designed to be flat or two-dimensional, for example.

The dry chamber and the wet chamber are accordingly spaced apart from one another by an air gap.

For example, the sealing of the separation element with respect to the stator core can be realized at the annular walls in the radial direction.

This means that an annular seal rests against one annular wall each in the radial direction and achieves a sealing effect there.

In this regard, the sealing itself can be provided, in each case, on annular surface regions.

A respective element of the stator core that effects the sealing of the separation element can be an add-on part of the stator core, or it can be an integral part of the stator core.

To ensure a reliable sealing effect, at least one of the annular walls can be designed to be thicker in the surface region of the abutment of a seal than on the side of the axial delimitation of the wet chamber.

This greater wall thickness serves in particular to absorb elastic restoring forces of sealing elements and is accordingly designed to exhibit sufficient compressive strength. At the same time, the separation element can be secured in position in the axial direction in a form-fitting manner.

Likewise, the surface of the annular wall in the region of the abutment of the seal is advantageously designed with less roughness than on the side of the axial delimitation of the wet chamber, in order to ensure sufficient liquid-tightness.

In an advantageous embodiment, the material of the separation element is a non-metallic material. This ensures that the separation element itself realizes no or only minor electromagnetic losses during operation of the electric prime mover.

Furthermore, the separation element can be connected to the stator core and/or to at least one winding by means of a material bond. In particular, the material bond can be an adhesive connection for fixing the separation element on the stator core, wherein the adhesive connection is advantageously formed as planar.

The material bond ensures that the separation element extends axially substantially two-dimensionally even in the event of excess pressure in the wet chamber or a pressure difference between the wet chamber and the dry chamber, and thus does not restrict the air gap between the stator and the rotor. In this regard, the material bond can, at the same time, also serve to seal the separation element.

To prevent an unintentional reduction of the air gap between stator and rotor, the separation element can be arranged with a compressive preload acting in axial direction on the stator core and/or at least one winding. This means that the separation element is fixed to the stator core under a preload, so that the preload prevents axial bulging of the separation element and thus prevents a reduction of the air gap between the separation element and an axially adjacent rotor of an axial flux machine, caused by excess pressure in the wet chamber.

Furthermore, the axial delimiting side of the separation element can have axial forming elements such as beads to increase the area moment of inertia of the axial delimiting side and thus improve the bending stiffness, which also counteracts an axial bulging. At the same time, this provides elements which, in the event of differing temperature-related expansion of individual components of the stator, allow bending in the plane of the axial outer side of the separation element and thus enable differing temperature-related displacements of individual areas of the separation element which are firmly connected to the stator core and/or to the windings, without inadmissible compressive or tensile stresses occurring in the separation element.

Such forming elements can, in particular, axially overlap the stator teeth. For example, surface regions of the separation element which axially overlap the stator teeth can have a smaller axial distance from the stator core than surfaces of the separation element arranged adjacent to these surface regions, so that overall the separation element has depressions on its axial outer side corresponding to the positions of the stator teeth.

According to a further aspect, the disclosure relates to an electric prime mover, in particular an axial flux machine, comprising a stator according to the disclosure and a rotor, wherein the rotor is arranged in a dry chamber of the electric prime mover.

The separation element is consequently arranged in the air gap of the electric prime mover.

BRIEF DESCRIPTION OF THE DRAWINGS

The disclosure described above is explained in detail below against the pertinent technical background with reference to the accompanying drawings, which show preferred embodiments in the form of an axial flux machine. The disclosure is not limited in any way by the purely schematic drawings, wherein it should be noted that the embodiments shown in the drawings are not limited to the dimensions shown. In the drawings.

DETAILED DESCRIPTION

First, the general structure of an axial flux machine 1 is explained with reference to FIGS. 1 and 2.

Figure 1:
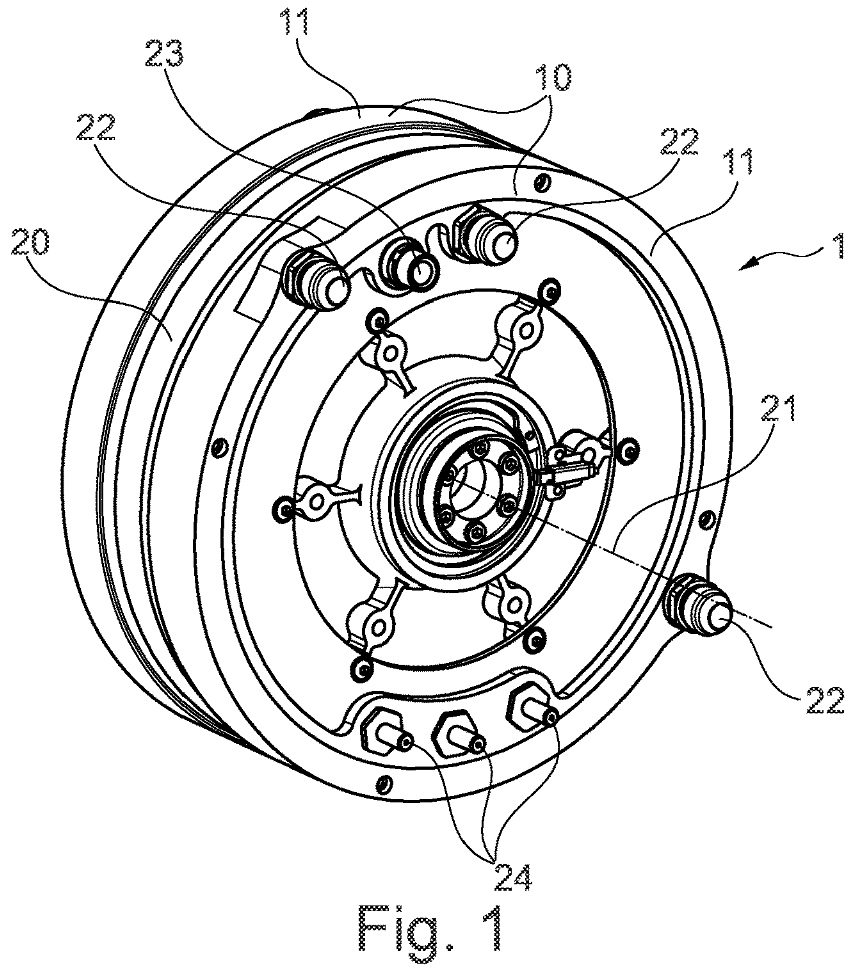
FIG. 1: shows an axial flux machine in a perspective view.
Figure 2:
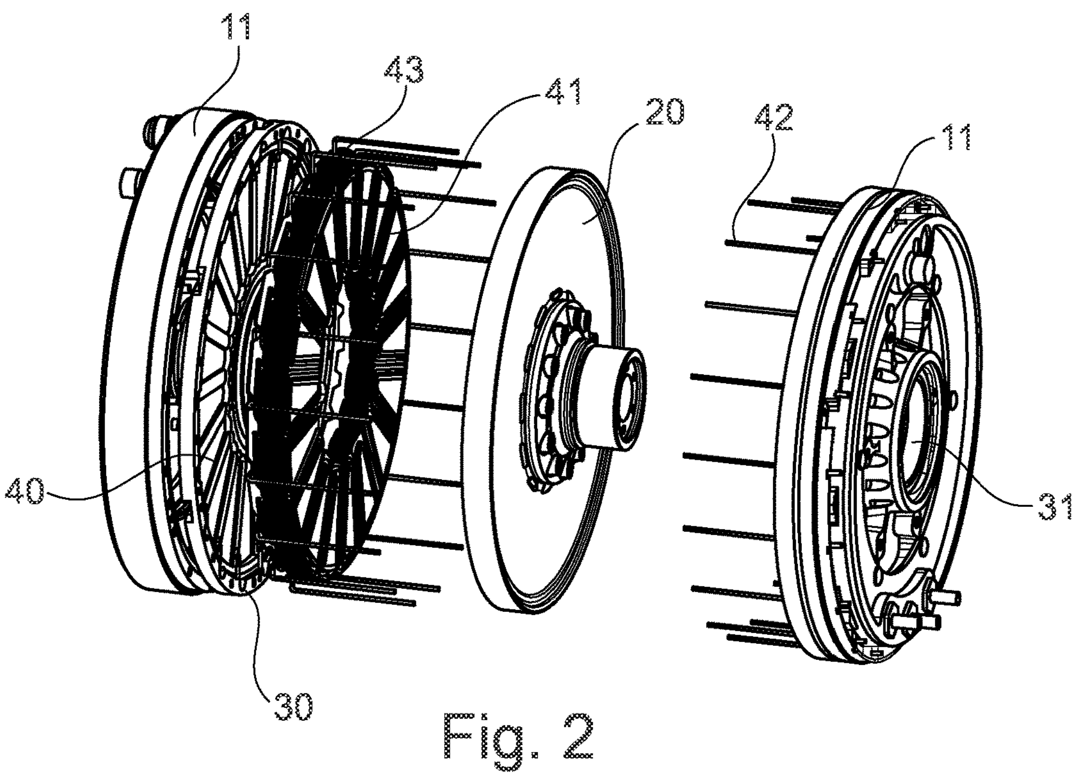
FIG. 2: shows a conventional axial flux machine in an exploded view.

In the embodiment shown here, the conventional axial flux machine 1 shown in FIGS. 1 and 2 comprises as the stator 10 two stator halves 11, between which a rotor 20 rotatable about an axis of rotation 21 is axially arranged relative to the stator halves 11. A respective stator 10 comprises a bore 31 or passage in the central region for the shaft of the rotor 20 to pass therethrough.

On at least one stator half 11, in the embodiment shown here, multiple coolant connections 22 as well as a plug-in connection 23 for a control connection and multiple phase connections 24 are arranged.

As can be seen from the exploded view in FIG. 2, a respective stator half 11 comprises a so-called stator yoke, which can also be referred to as a stator core 30. From this stator core 30, stator teeth 40 arranged substantially in a star shape extend in the axial direction.

As can also be seen from the exploded view in FIG. 2, a respective stator half 11 further comprises a number of windings 43 corresponding to the number of stator teeth 40. A winding 43 is associated with each stator tooth 40. On the stator half 11 shown on the right in FIG. 2, only the connections 42 of these windings 43 are visible. The totality of the windings constitutes the entire winding assembly 41.

These connections 42, which are substantially parallel to the axis of rotation of the axial flux machine, connect axially opposite windings 43 to one another.

Compared to the embodiment shown in FIG. 2, an axial flux machine designed according to the disclosure additionally has a separation element, as can be seen in FIGS. 3-9.

Figure 3:
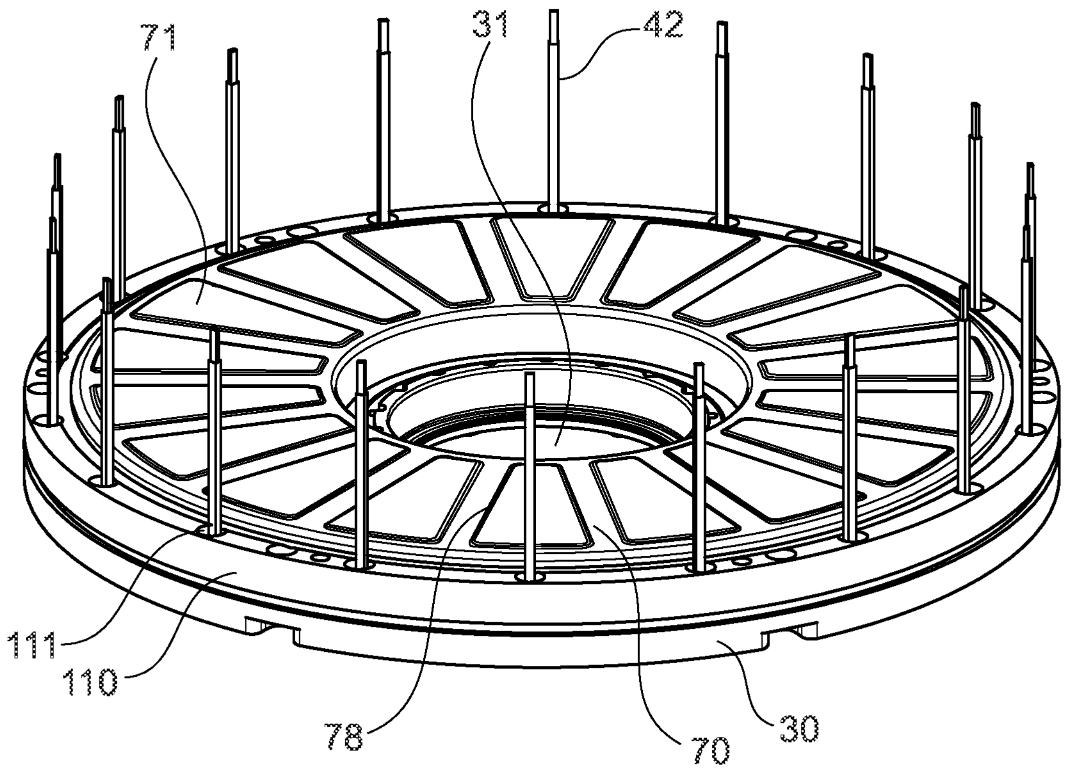
FIG. 3: shows a stator half of the axial flux machine designed according to the disclosure in a perspective view.

FIG. 3 shows a stator half 11 of the axial flux machine in a perspective view. It comprises the stator core 30 and windings axially offset in relation thereto, which are not visible here. These windings are covered by the separation element 70 shown here. It can be seen that the separation element 70 substantially has the form of a circular ring.

In addition, it can be seen that the separation element 70 is formed substantially in the shape of a plane 71 on its axial side. Just as the stator core 30 has a central bore 31 in the center, the separation element 70 is also designed to be continuous in the central region.

It can further be seen that the separation element 70 is profiled in accordance with the arrangement of stator teeth thereunder by the arrangement of axial forming elements 78, which extend slightly out of the plane 71.

Radially on the outside, the separation element 70 is surrounded by an outer fastening ring 110, which has passages 111 in the form of bores, for the passage of connections 42 of the windings not shown here.

Figure 4:
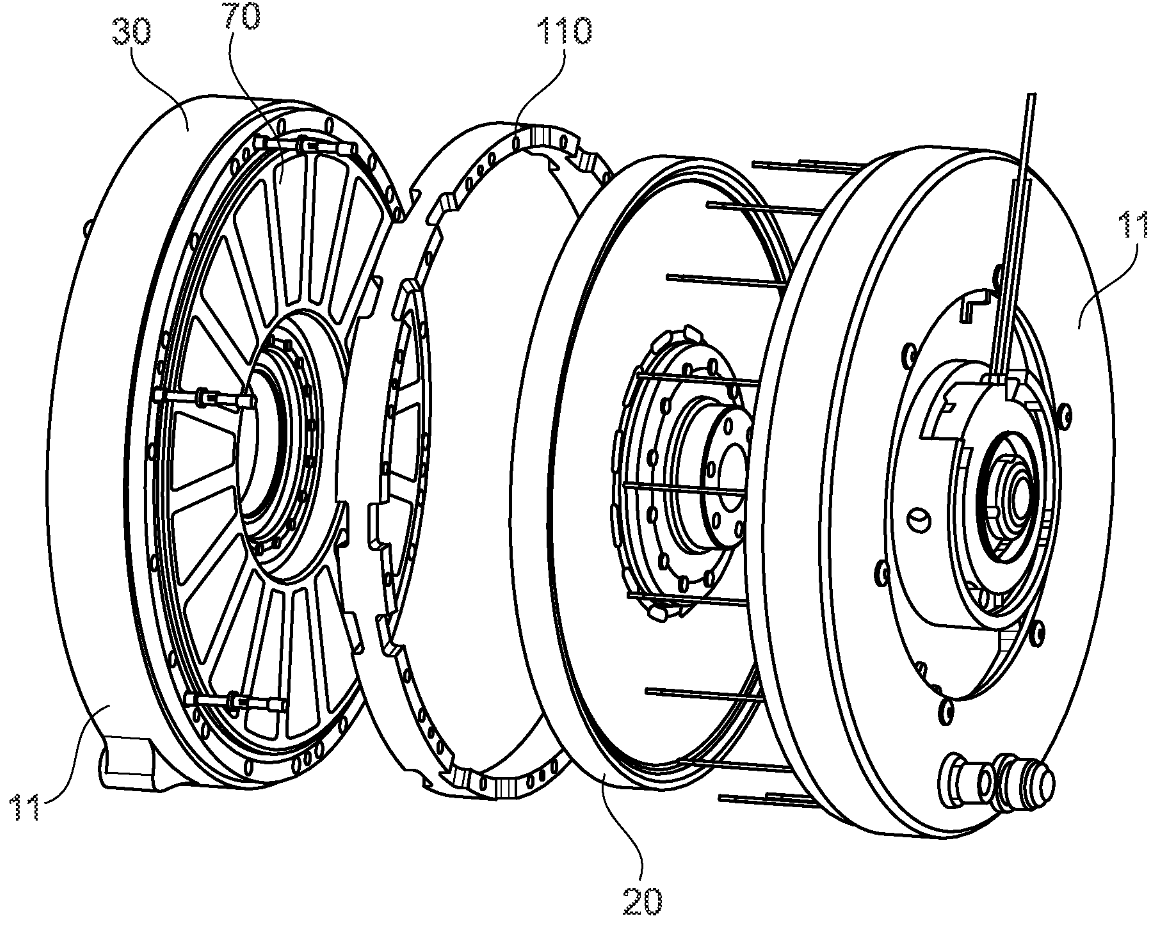
FIG. 4: shows an axial flux machine according to the present disclosure in an exploded view.

FIG. 4 shows an exploded view of an electric prime mover according to the disclosure in the form of an axial flux machine.

In contrast to the embodiment shown in FIG. 2, the windings are already axially covered here by the separation element 70. Furthermore, the outer fastening ring 110 is shown before it is mounted on the separation element 70.

Figure 5:
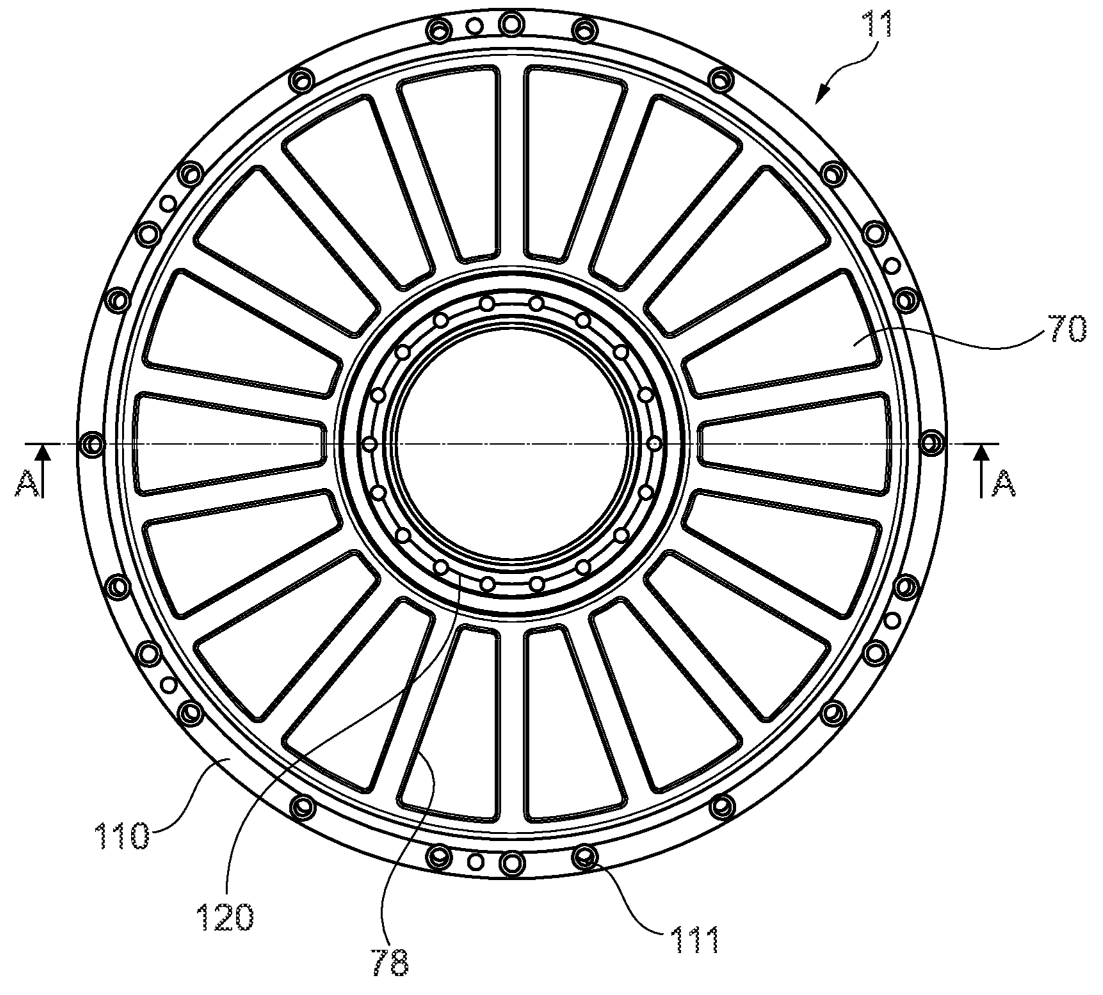
FIG. 5: shows a separation element in a plan view.

FIG. 5 shows a stator half 11 with the separation element 70 together with the outer fastening ring 110 and an inner fastening ring 120 arranged in the central region in a plan view. Also clearly visible in the outer fastening ring 110 are the passages 111 for the connections of the windings, which are not shown here.

Figure 6:
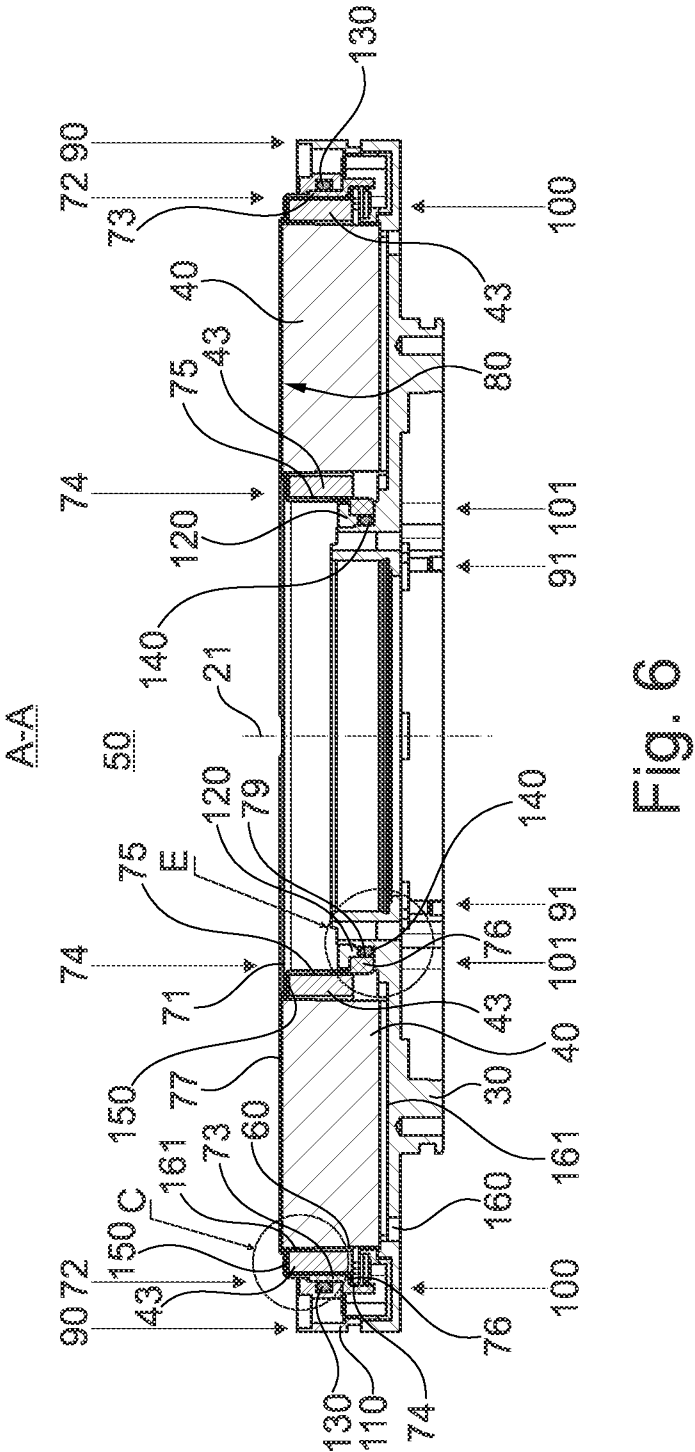
FIG. 6: shows a stator half in section according to the sectional course A-A indicated in FIG. 5, FIG. 7: shows detail C from FIG. 6, FIG. 8: shows detail E from FIG. 6, and FIG. 9: shows a magnified detail in the region of adjacent windings.

FIG. 6 shows a section through the stator half 11 shown in FIG. 5 and the separation element 70 according to the sectional line A-A.

Clearly visible here are the stator teeth 40, as well as the windings 43 wound thereon around the stator teeth 40. Furthermore, the separation element 70 is visible, which axially delimits the stator half 11.

The separation element 70 comprises a first annular wall 73 and a second annular wall 75 arranged at different radial distances with respect to the axis of rotation 21. These annular walls 73, 75 extend substantially perpendicular to the plane 71, which is formed axially by the separation element 70. A connecting section 77 realized radially between the two annular walls 73, 75 is correspondingly designed as planar.

An annular cavity 80 is thus formed between the annular walls 73, 75 due to the annular walls 73, 75.

The separation element 70 is sealed at the two annular walls 73, 75, namely at the first annular wall 73 by a first seal 130, and at the second annular wall 75 by a second seal 140.

Thus, the first seal 130 is formed on a first periphery 72 of the separation element 70, which has a smaller distance from the axis of rotation 21 than the radial outer side 90 of the stator core 30, but has a greater distance from the axis of rotation 21 than the radial outer side 100 of the annular shape of the winding arrangement.

Thus, the second seal 140 is formed on a second periphery 72 of the separation element 70, which has a greater distance from the axis of rotation 21 than the radial inner side 91 of the stator core 30, but has a greater distance from the axis of rotation 21 than the radial inner side 101 of the annular shape of the winding arrangement.

The first seal 130 abuts the radially inner side of the outer fastening ring 110 on its side radially opposite the first annular wall 73.

The first seal 140 abuts the radially outer side of the inner fastening ring 120 on its side radially opposite the second annular wall 75.

This seals off the wet chamber 60 of the stator half 11 from a dry chamber 50 not shown separately here, in which a stator 20 shown in FIG. 4 is to run.

In particular, the fastening rings 110, 120 can be screwed and/or caulked to the stator core 30.

In the region of the abutment of a respective seal 130, 140 on a respective annular wall 73, 75, the relevant annular wall 73, 75 is designed with a thickened section 76 with a larger ceiling than on the axial delimiting side. This serves in particular to increase the compressive strength of the relevant wall section in relation to a compressive stress exerted by a respective seal 130, 140.

In the embodiment shown here, a respective thickened section 76 further realizes an undercut 79 behind a respective fastening ring 110, 120 to thereby also support a fixation of the separation element 70 in the axial direction.

In the embodiment shown here, the connecting section 77 between the first annular wall 73 and the second annular wall 75 is connected via a material bond at least to the axial end face of the windings 43 by means of adhesive connections 150, in order to counteract axial bulging of the separation element 70 and at the same time to realize a sealing effect.

Coolant can thus be directed into the wet chamber 60 delimited by the separation element 70 via a coolant connection 160 in the stator core 30. The windings 43 are arranged in this wet chamber 60 so that the coolant can flow directly around them. In this regard, the coolant can flow through the gaps 161 shown between the stator core 30 and the stator tooth 40 and between the stator tooth 40 and the winding 43 and also radially around the windings 43 and thus between the winding 43 and a respective annular wall 73, 75 of the separation element 70.

FIG. 7 shows an enlarged view of the detail C from FIG. 6. Here, the wet chamber 60 is clearly visible, in which the winding 43 is located, wherein coolant can flow around the winding 43 through the gaps 161. Furthermore, the adhesive connection 150 for fixing the separation element 70 to the stator tooth 40 is also visible.

It can also be clearly seen here that the separation element 70 is designed to be recessed in its region axially overlapping the winding 43, thus forming an axial forming element 78.

FIG. 8 shows the detail E indicated in FIG. 6 in a magnified view. Here, again, the thickened section 76 on the second annular wall 75 can be seen, against which the second seal 140, held by the inner fastening ring 120, rests. Again, a shoulder of the inner fastening ring 120 blocks the thickened section 76 of the second annular wall 75 from moving axially.

FIG. 9 shows a magnified detail in the region of adjacent windings.

Here, it can be seen that axial forming elements 78 result in depressions 162, which cover the windings 43 of adjacent stator teeth 40. The axial forming elements 78 thus allow displacements of individual components with differing thermal expansion behavior despite bonding between the separation element 70 and further components of the stator half 11.

The stator proposed here, and the electric prime mover equipped with it, constitute units which implement long-lasting and efficient cooling of the stator while using a small axial installation space.

LIST OF REFERENCE SYMBOLS

1 Axial flux machine
10 Stator
11 Stator half
20 Rotor
21 Axis of rotation
22 Coolant connection
23 Plug-in connection
24 Phase connection
30 Stator core
31 Central bore
40 Stator tooth
41 Winding assembly
42 Connection
43 Winding
50 Dry chamber
60 Wet chamber
70 Separation element
71 Plane
72 First periphery
73 First annular wall
74 Second periphery
75 Second annular wall
76 Thickened section
77 Connecting section
78 Axial forming element
79 Undercut
80 Annular cavity
90 Radial outer side of the stator core
91 Radial inner side of the stator core
100 Radial outer side of the annular shape of the winding arrangement
101 Radial inner side of the annular shape of the winding arrangement
110 Outer fastening ring
111 Passage
120 Inner fastening ring
130 First seal
140 Second seal
150 Adhesive connection
160 Coolant connection
16 Gap
162 Depression

The invention claimed is:

1. A stator of an electric prime mover comprising:
a stator core and windings of at least one electrical conductor arranged in an annular shape on the stator core, and at least one wet chamber for a coolant to flow through, so that heat from at least one of the windings can be absorbed by the coolant, a separation element separating the wet chamber in a substantially liquid-tight manner from a dry chamber of the electric prime mover at least on an axial side of the stator, wherein the separation element is sealed with respect to the stator core at a first periphery and at a second periphery, wherein the first periphery has a smaller radial extent than a radial outer side of the stator core and a larger radial extent than a radial outer side of the annular shape of the windings and the second periphery has a larger radial extent than a radial inner side of the stator core and a smaller radial extent than a radial inner side of the annular shape of the windings, and wherein the separation element is compressively preloaded in an axial direction on at least one of the stator core or at least one winding.

2. The stator according to claim 1, wherein the separation element axially delimits the stator.

3. The stator according to claim 2, wherein the separation element includes a substantially planar axial side.

4. The stator according to claim 2, wherein the wet chamber is substantially annular, the separation element has two substantially annular walls arranged concentrically and extending in an axial direction, and an annular cavity between the annular walls axially and radially separating the wet chamber from an adjacent dry chamber.

5. The stator according to claim 4, wherein the separation element is sealed to the stator core at the annular walls in a radial direction.

6. A stator of an electric prime mover comprising:

a stator core and windings of at least one electrical conductor arranged in an annular shape on the stator core, and at least one wet chamber for a coolant to flow through, so that heat from at least one of the windings can be absorbed by the coolant, a separation element separating the wet chamber in a substantially liquid-tight manner from a dry chamber of the electric prime mover at least on an axial side of the stator, wherein the separation element is sealed with respect to the stator core at a first periphery and at a second periphery, wherein the first periphery has a smaller radial extent than a radial outer side of the stator core and a larger radial extent than a radial outer side of the annular shape of the windings and the second periphery has a larger radial extent than a radial inner side of the stator core and a smaller radial extent than a radial inner side of the annular shape of the windings, wherein the separation element axially delimits the stator, wherein the wet chamber is substantially annular, the separation element has two substantially annular walls arranged concentrically and extending in an axial direction, and an annular cavity between the annular walls axially and radially separating the wet chamber from an adjacent dry chamber, wherein the separation element is sealed to the stator core at the annular walls in a radial direction, and wherein at least one of the annular walls is thicker in a surface region of an abutment of a seal than on a side of delimitation of the wet chamber.

7. The stator according to claim 1, wherein the separation element comprises a non-metallic material.

8. The stator according to claim 1, wherein the separation element is connected to at least one of the stator core or to at least one winding by a material bond.

9. An electric prime mover, comprising a stator and a rotor, wherein the stator includes:

a stator core and windings of at least one electrical conductor arranged in an annular shape on the stator core, and at least one wet chamber for a coolant to flow through, so that heat from at least one of the windings can be absorbed by the coolant, a separation element separating the wet chamber in a substantially liquid-tight manner from a dry chamber of the electric prime mover at least on an axial side of the stator, wherein the separation element is sealed with respect to the stator core at a first periphery and at a second periphery, wherein the first periphery has a smaller radial extent than a radial outer side of the stator core and a larger radial extent than a radial outer side of the annular shape of the windings and the second periphery has a larger radial extent than a radial inner side of the stator core and a smaller radial extent than a radial inner side of the annular shape of the windings;

wherein the rotor is arranged in the dry chamber of the electric prime mover; and wherein the separation element is compressively pre-loaded in an axial direction on at least one of the stator core or at least one winding.

10. The stator according to claim 9, wherein the separation element axially delimits the stator.

11. The stator according to claim 10, wherein the separation element includes a substantially planar axial side.

12. The stator according claim 10, wherein the wet chamber is substantially annular, the separation element has two substantially annular walls arranged concentrically and extending in an axial direction, and an annular cavity between the annular walls axially and radially separating the wet chamber from an adjacent dry chamber.

13. The stator according to claim 12, wherein the separation element is sealed to the stator core at the annular walls in a radial direction.

14. The stator according to claim 13, wherein at least one of the annular walls is thicker in a surface region of an abutment of a seal than on a side of delimitation of the wet chamber.

15. The stator according to claim 9, wherein the separation element comprises a non-metallic material.

16. The stator according to claim 9, wherein the separation element is connected to at least one of the stator core or to at least one winding by a material bond.

* * * * *